Mar. 13, 1923.
G. P. WASHBURN
GAS AND AIR MIXER
Filed Mar. 15, 1921
1,448,320
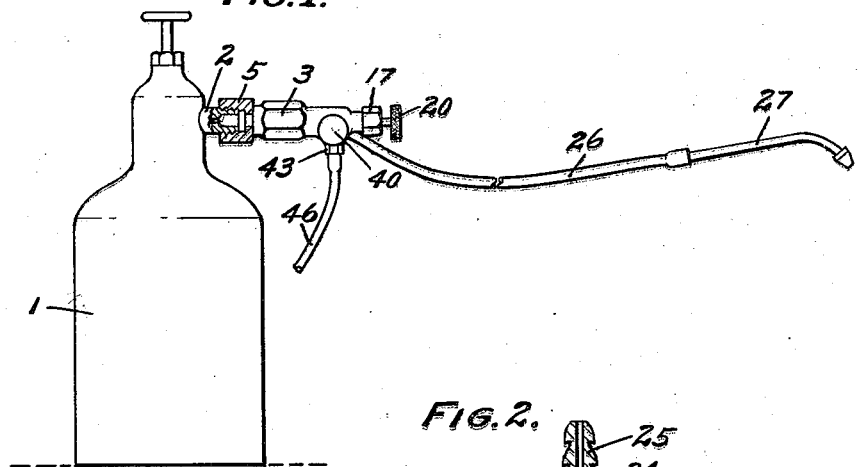
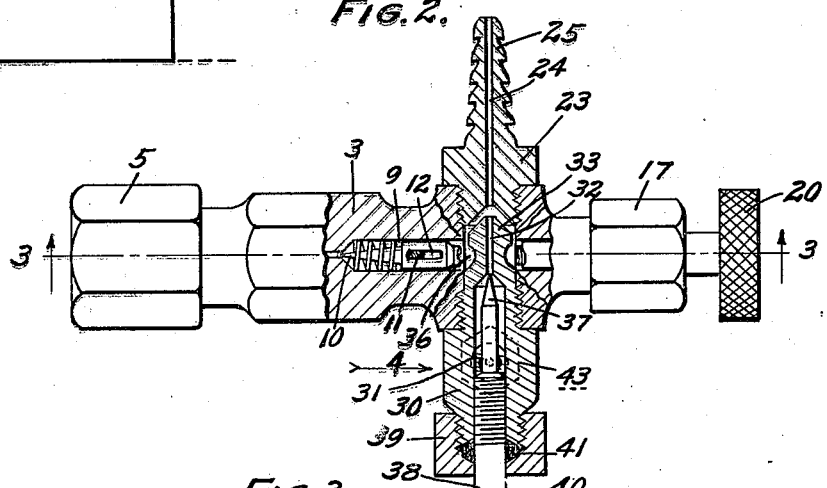
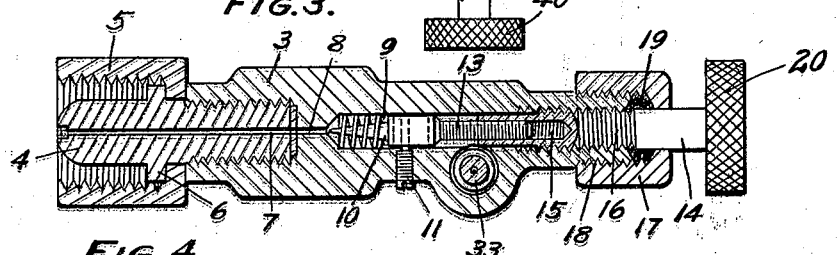
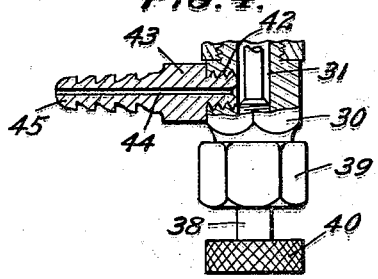
GEORGE P. WASHBURN INVENTOR.
BY
*Hazard & Miller*
ATTORNEYS.

Patented Mar. 13, 1923.

1,448,320

UNITED STATES PATENT OFFICE.

GEORGE P. WASHBURN, OF LOS ANGELES, CALIFORNIA.

GAS AND AIR MIXER.

Application filed March 15, 1921. Serial No. 452,630.

*To all whom it may concern:*

Be it known that I, GEORGE P. WASHBURN, a citizen of the United States, residing at Los Angeles, in the county of Los Angeles and State of California, have invented new and useful Improvements in Gas and Air Mixers, of which the following is a specification.

It is the object of this invention to provide an improved valve structure forming a mixing valve which may be employed for mixing a fuel, such as gas, with air, oxygen, or the like, so as to form a combustible mixture adapted to be discharged from the mixing valve through a suitable hose leading to a burner.

The improved valve structure provides an extremely simple and compact arrangement whereby the gas and oxygen may be mixed, and the supply of each of said fluids readily controlled.

The invention will be readily understood from the following description of the accompanying drawings, in which—

Figure 1 is a side elevation showing a mixing valve, constructed in accordance with the invention, in use.

Fig. 2 is a plan view of the mixing valve, partly in axial section.

Fig. 3 is an axial section on the line 3—3 of Fig. 2.

Fig. 4 is a side elevation of a portion of the valve structure looking in the direction indicated by the arrow 4 in Fig. 2, and partly in axial section.

The improved valve structure is illustrated as connected to the nipple of a supply tank, such as an oxygen tank, with a fuel supply hose attached to the nipple of the valve structure, so that the fuel and oxygen may be mixed within the valve structure and discharged through a nipple having a hose connected thereto which leads to a usual burner.

The oxygen supply tank is shown at 1 provided with a usual discharge nipple 2. The valve structure includes a body member 3 having a nipple 4 threaded into one end thereof and connected to nipple 2 by means of a threaded collar 5 engaging an annular projection 6 upon nipple 4 and making threaded engagement with nipple 2. The nipple 4 is provided with an axial bore 7 communicating with the bore of nipple 2 and at its inner end communicating with a bore 8 in the body 3 of the valve structure.

The bore 8 communicates within body 3 with a conduit 9 extending through the body member 3 to its opposite end. A needle valve 10 is arranged within conduit 9 to seat in the end of bore 8 and is held against rotary movement while permitting of longitudinal adjustment thereof by a set screw 11 threaded through body member 3 and received within a slot 12 provided in the needle valve.

The shank 13 of the needle valve is threaded and a valve rod 14 received within the end of conduit 9 is internally threaded as shown at 15 so as to be received over the end of the valve shank. The valve rod is also externally threaded as shown at 16, so as to make threaded engagement with the conduit 9. The valve rod may be held in position by a usual collar 17 threaded onto the end of body 3, as shown at 18, and having packing 19 positioned between said collar and the valve rod and the body of the valve structure. The projecting end of the valve rod is provided with a usual operating head 20.

The body of the valve structure is provided with a transverse bore at one side of conduit 9 and communicating at its side with the side of conduit 9. A discharge nipple 23 is threaded into one end of this transverse bore and is provided with an axial bore 24 extending through a usual connection 25 for a hose provided at its outer end. A hose 26 is connected to this nipple, and at its opposite end is connected to a usual burner 27.

A nipple 30 is threaded into the opposite end of the transverse bore of the valve structure and is provided with an axial conduit 31 communicating at its inner end with a bore 32 provided in a nozzle 33 upon the inner end of nipple 30 and arranged within the transverse bore beyond the point of communication between the transverse bore and conduit 9. Bore 32 of the nozzle 33 communicates with the transverse bore of the valve structure and with an annular space 36 surrounding said nozzle within the transverse bore at the point of communication between said transverse bore and conduit 9.

The flow through bore 32 is controlled by a needle valve 37 within conduit 31 and seating in the end of bore 32. This needle valve is controlled by a valve rod 38 threaded into conduit 31 and retained in position by means of a collar 39 threaded onto the end of nipple 30 with the operating head 40 of the valve rod projecting beyond the same. Suitable packing 41 is preferably provided between nipple 30 and valve rod 38 and the collar 39.

The flow to conduit 31 is provided by forming a transverse threaded opening 42 in nipple 30, said opening communicating with conduit 31 and having a nipple 43 threaded into the same. This nipple is provided with a bore 44 and terminates in a usual connecting head 45 having a hose 46 attached thereto.

The hose 46 is connected to a fuel supply, and it will thus be seen that the fuel will be discharged through bore 32 into a discharge nozzle 23, while the oxygen is discharged into the annular space 36 within the transverse bore and surrounding nozzle 33, so that said fuel will mix with the oxygen supplied through conduit 9. The combustible mixture thus formed is discharged through the bore 24 of nipple 23 to the burner 27. It will be noted that the flow of oxygen may be minutely adjusted by means of needle valve 10, and that the flow of the fuel may be controlled through needle valve 37.

I have thus provided an extremely simple valve structure wherein means are provided for the efficient mixing of fuel and oxygen or air so that the combustible mixture may be conveniently discharged to a burner.

Various changes may be made without departing from the spirit of the invention as claimed.

What is claimed is:

1. The combination with a supply tank having a nipple, of a mixing valve structure attachable to said nipple, said valve structure including a longitudinal conduit communicating with said nipple and having a needle valve control, a transverse conduit, a connecting nipple projecting therefrom at one end and having a fuel supply hose connected to the same, a connecting nipple projecting from the opposite end of said transverse conduit and having a discharge hose connected to the same, a valve control for said transverse conduit, said transverse conduit communicating with said longitudinal conduit beyond said valve control.

2. A mixing valve structure comprising a body having a longitudinal conduit having a valve control, and a second conduit disposed transversely of the first conduit and at one side thereof, inlet and discharge nipples detachably associated with the body and communicating with the transverse conduit, a nozzle carried by the inlet nipple and disposed within the longitudinal and transverse conduits, and a valve for controlling the passage of fluid from said nozzle.

3. A mixing valve structure including a longitudinal conduit having a valve control, said valve structure also having a transverse bore at one side of said longitudinal conduit and communicating with one side of the same, a discharge conduit in one end of said bore, and an intake conduit having a valve control in the other end of said bore, said intake conduit having a discharge nozzle at its inner end beyond the longitudinal conduit and communicating with an annular space within said bore and surrounding said nozzle at said longitudinal conduit.

4. A mixing valve structure including a longitudinal conduit having a valve control, said valve structure also having a transverse bore at one side of said longitudinal conduit and communicating with one side of the same, and an intake conduit in said bore having a discharge nozzle at its inner end communicating with said bore at said longitudinal conduit.

In testimony whereof I have signed my name to this specification.

GEORGE P. WASHBURN.